US010129229B1

(12) United States Patent
Leavy et al.

(10) Patent No.: US 10,129,229 B1
(45) Date of Patent: Nov. 13, 2018

(54) PEER VALIDATION

(71) Applicant: Wickr Inc., San Francisco, CA (US)

(72) Inventors: Thomas Michael Leavy, Hoboken, NJ (US); Dipakkumar R. Kasabwala, Clifton, NJ (US)

(73) Assignee: Wickr Inc., San Francisco, CA (US)

( * ) Notice: Subject to any disclaimer, the term of this patent is extended or adjusted under 35 U.S.C. 154(b) by 147 days.

(21) Appl. No.: 15/331,726

(22) Filed: Oct. 21, 2016

Related U.S. Application Data

(60) Provisional application No. 62/375,388, filed on Aug. 15, 2016.

(51) Int. Cl.
*H04L 29/06* (2006.01)
*H04L 9/32* (2006.01)
*H04L 9/08* (2006.01)

(52) U.S. Cl.
CPC .......... *H04L 63/061* (2013.01); *H04L 9/0869* (2013.01); *H04L 9/3247* (2013.01); *H04L 9/3271* (2013.01); *H04L 63/0435* (2013.01); *H04L 63/0442* (2013.01)

(58) Field of Classification Search
CPC . H04L 63/061; H04L 9/3247; H04L 63/0442; H04L 63/0435; H04L 9/0869; H04L 9/3271
See application file for complete search history.

(56) References Cited

U.S. PATENT DOCUMENTS

| | | | | |
|---|---|---|---|---|
| 6,052,787 A | * | 4/2000 | Euchner | H04L 9/0833 380/30 |
| 7,302,585 B1 | * | 11/2007 | Proudler | G06F 21/84 713/189 |
| 7,353,388 B1 | | 4/2008 | Gilman et al. | |
| 8,452,966 B1 | * | 5/2013 | Petersen | G06F 21/51 713/168 |
| 9,319,228 B2 | * | 4/2016 | Anka | H04L 12/1822 |
| 9,591,479 B1 | * | 3/2017 | Leavy | H04L 9/0643 |
| 9,628,271 B2 | * | 4/2017 | Blom | H04L 63/061 |
| 9,806,887 B1 | | 10/2017 | Campagna | |

(Continued)

OTHER PUBLICATIONS

Apple. iOS Security: iOS 9.3 or later. May 2016.
WhatsApp Encryption Overview Technical White Paper. Apr. 4, 2016.

*Primary Examiner* — David Garcia Cervetti
(74) *Attorney, Agent, or Firm* — Christian LaForgia

(57) ABSTRACT

The present disclosure describes systems and methods for authenticating a called party during the initialization stage of establishing a secure telecommunication channel to provide assurances to the initiator that they are communicating with whom they intended. A first user issues a challenge that includes a nonce to one or more second user devices. The second user's secure collaboration application receives the challenge, signs the nonce included in the challenge, and sends the response with the signed nonce to the first user. The first user receives the response and determines whether the signature of the first nonce is valid. If the signature is not valid, the first user's secure collaboration application terminates the secure telecommunication. However, if the signature received in the response is valid, the first user's secure collaboration application begins exchanging encrypted telecommunication data with the second user over a secure telecommunication channel.

19 Claims, 6 Drawing Sheets

(56) References Cited

U.S. PATENT DOCUMENTS

| | | | | |
|---|---|---|---|---|
| 9,860,067 B2* | 1/2018 | Piqueras Jover | H04L 9/3247 | |
| 2002/0001386 A1* | 1/2002 | Akiyama | G06Q 10/02 | 380/201 |
| 2002/0176581 A1* | 11/2002 | Bilgic | H04L 63/0428 | 380/270 |
| 2002/0194501 A1* | 12/2002 | Wenocur | G06Q 10/107 | 726/4 |
| 2003/0217165 A1* | 11/2003 | Buch | H04L 29/06027 | 709/229 |
| 2004/0267938 A1* | 12/2004 | Shoroff | H04L 12/1813 | 709/227 |
| 2005/0188193 A1* | 8/2005 | Kuehnel | G06F 21/445 | 713/155 |
| 2005/0268328 A1* | 12/2005 | Corliano | H04L 12/1818 | 726/3 |
| 2006/0265262 A1* | 11/2006 | Kamdar | G06Q 10/109 | 705/80 |
| 2006/0276137 A1* | 12/2006 | Pummill | H04L 63/0853 | 455/67.11 |
| 2007/0074032 A1* | 3/2007 | Adams | G06F 21/629 | 713/176 |
| 2007/0074033 A1* | 3/2007 | Adams | G06F 21/629 | 713/176 |
| 2007/0074034 A1* | 3/2007 | Adams | G06F 21/629 | 713/176 |
| 2007/0074044 A1* | 3/2007 | Brickell | G06F 21/725 | 713/187 |
| 2007/0129005 A1* | 6/2007 | Goldberg | G10H 1/0025 | 455/3.06 |
| 2007/0297393 A1* | 12/2007 | Furukawa | H04L 12/66 | 370/352 |
| 2008/0095339 A1* | 4/2008 | Elliott | H04L 12/14 | 379/93.01 |
| 2009/0154707 A1* | 6/2009 | Lee | H04L 9/0822 | 380/278 |
| 2010/0002687 A1* | 1/2010 | Rosenberg | H04M 3/5232 | 370/352 |
| 2011/0023096 A1* | 1/2011 | Xiao | H04L 63/0236 | 726/5 |
| 2011/0072266 A1* | 3/2011 | Takayama | G06F 21/445 | 713/169 |
| 2011/0093710 A1* | 4/2011 | Galvin | H04L 63/061 | 713/169 |
| 2011/0143715 A1* | 6/2011 | Labrador | H04M 3/382 | 455/411 |
| 2012/0117156 A1* | 5/2012 | Anka | G06Q 10/101 | 709/205 |
| 2012/0185291 A1* | 7/2012 | Ramaswamy | G06Q 10/1095 | 705/7.19 |
| 2012/0311329 A1* | 12/2012 | Medina | H04L 12/581 | 713/168 |
| 2012/0311686 A1* | 12/2012 | Medina | H04L 63/0807 | 726/7 |
| 2013/0077539 A1* | 3/2013 | Averill | H04L 12/1818 | 370/261 |
| 2013/0179941 A1* | 7/2013 | McGloin | G06Q 10/10 | 726/3 |
| 2014/0108810 A1* | 4/2014 | Chenna | H04L 9/321 | 713/179 |
| 2014/0120874 A1* | 5/2014 | Kang | H04W 12/04 | 455/411 |
| 2014/0155045 A1* | 6/2014 | Bennett, Jr. | H04M 3/565 | 455/416 |
| 2014/0235203 A1* | 8/2014 | Gonsalves | H04L 63/0823 | 455/410 |
| 2014/0380056 A1* | 12/2014 | Buckley | H04L 9/0847 | 713/171 |
| 2015/0188899 A1* | 7/2015 | Bakar | H04L 67/125 | 726/9 |
| 2015/0207708 A1* | 7/2015 | Raleigh | H04L 67/2804 | 709/217 |
| 2016/0014119 A1* | 1/2016 | Inoue | H04L 63/0853 | 726/9 |
| 2016/0127128 A1* | 5/2016 | Chen | H04L 9/3247 | 713/189 |
| 2016/0150089 A1* | 5/2016 | Garg | H04M 7/003 | 370/352 |
| 2016/0212137 A1* | 7/2016 | Pottier | H04L 63/101 | |
| 2016/0285948 A1* | 9/2016 | Saint-Hilaire | H04L 67/02 | |
| 2016/0373260 A1* | 12/2016 | Jerkeby | H04L 9/3247 | |
| 2017/0070563 A1* | 3/2017 | Sundermeyer | H04L 67/025 | |
| 2017/0118028 A1* | 4/2017 | Hayes | G06F 3/0622 | |
| 2017/0185814 A1* | 6/2017 | Smith | H04L 9/0819 | |
| 2017/0250985 A1* | 8/2017 | Bakar | H04L 63/0892 | |
| 2017/0264450 A1* | 9/2017 | Horiuchi | H04L 12/1827 | |
| 2017/0278070 A1* | 9/2017 | Desai | H04W 4/023 | |
| 2017/0279780 A1 | 9/2017 | Fielder | | |
| 2017/0288867 A1* | 10/2017 | Collier | H04L 9/0861 | |
| 2017/0323273 A1* | 11/2017 | Meek | G06Q 10/10 | |

\* cited by examiner

PEER VALIDATION

CROSS-REFERENCE TO RELATED APPLICATIONS

This application claims priority to U.S. Provisional Application No. 62/375,388, entitled, "Peer Validation," filed Aug. 15, 2016, the entirety of which is incorporated herein by reference.

BACKGROUND OF THE INVENTION

Public Switched Telephone Networks (PSTNs) intrinsically include techniques for authenticating users wishing to communicate. For example, the inherent nature of dialing a telephone number provides a relatively high-level of assurance of who is on the other end of the line. The move to cellular and mobile devices also provides a relatively high degree of certainty of the identity with whom you are communicating through a variety of identifiers. In this regard, identifiers such as the Mobile Equipment Identifier (MEID) and the International Mobile Station Equipment Identity (IMEI) provide assurances that an initiator is communicating with whom he or she intended to call.

However, the advent, and subsequent rise, of smart phones, as well as improved Voice over IP (VOIP) solutions, allow users to communicate without the intrinsic authentication provided by traditional calling techniques. For example, users may download applications, like Skype and Google Hangouts, that allow them to communicate from any device after logging in with a username and password. While this provides a level of convenience, there is the possibility that a user's username and password are compromised and a malicious user may communicate on a user's behalf. Thus, there is a need, in communication applications, for a call initiator to authenticate a called party when initially establishing the communication channel to ensure the initiator is communicating with whom they intended.

BRIEF DESCRIPTION OF THE DRAWINGS

Various embodiments of the invention are disclosed in the following detailed description and the accompanying drawings.

DETAILED DESCRIPTION

Figure 1:
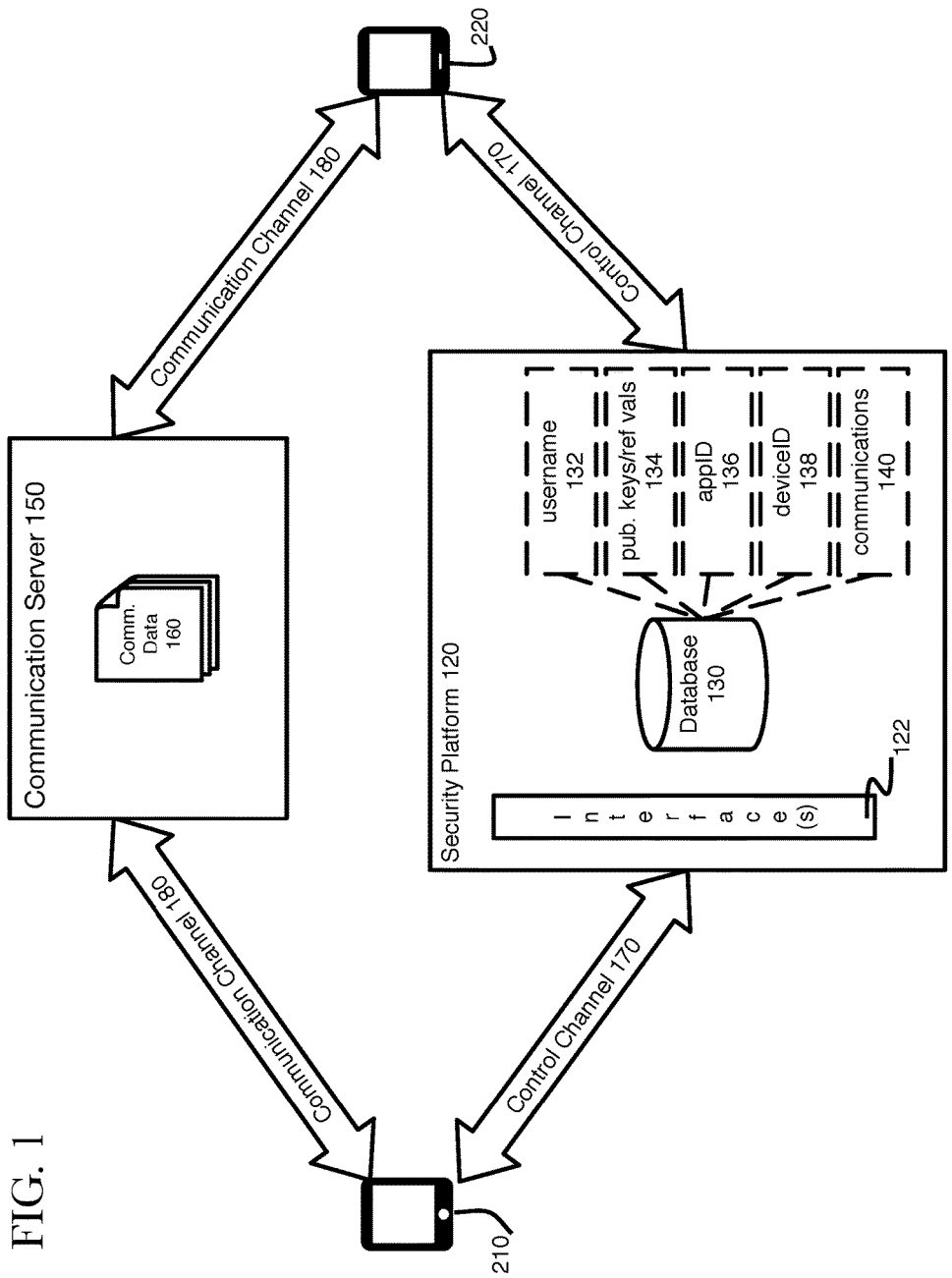
FIG. 1 illustrates a system for providing secure communications according to one embodiment of the disclosure.

The present disclosure describes systems and methods for authenticating a called party during the initialization stage of establishing a secure telecommunication channel to provide assurances to the initiator that they are communicating with whom they intended.

When a first user wishes to communicate securely communicate with friends or colleagues, the first user obtains a secure collaboration application that allows them to exchange encrypted communications, such as messages, files, calls, and video calls. Once the first user downloads and installs the secure collaboration application, they will need to register their account with the secure collaboration application provider. As part of the registration process, the first user creates a username and password. Concurrently, the downloaded secure collaboration application derives an application identifier, a unique device key, a first asymmetric key pair, and a second asymmetric key pair. The first asymmetric key pair ("user-level signing key pair") is a long-term key pair, associated with the first user, that is capable of generating and verifying signatures affiliated with the first user. The second asymmetric key pair ("application-level signing key pair") is a long-term key pair associated with secure collaboration application. The second asymmetric key pair is also capable of generating and verifying signatures affiliated with the instantiation of the secure collaboration application. That is, if the first user were to install the secure collaboration application on multiple devices, the first asymmetric key pair would be the same across all the devices while each device would have its own unique second asymmetric key pair.

After registering their account, the first user may begin communicating with friends and colleagues. When the first user wishes to communicate with a second user, the first user obtains the second user's public information from a secure directory. The second user's public information includes a first application identifier, a first unique device key, a first public signing key, and a second public signing key. If the second user has multiple instantiations of the secure collaboration app, the public information will also include an application identifier, a unique device key, and a second public signing key for each instantiation.

After retrieving the second user's public information, the first user may begin a secure telecommunication by transmitting a request to one or more of the second user's devices. Additionally, the first user issues a challenge to the one or more second user devices. The second user's secure collaboration application receives the challenge, signs the nonce included in the challenge with the second user's user-level private key, and sends a response with the signed nonce to the first user. The first user's secure collaboration application will determine whether a predetermined amount of time has elapsed since issuing the challenge. If the predetermined time has elapsed without receiving a response from the second user, the first user will terminate the secure telecommunication session. However, if the first user receives a response to the challenge before the predetermined time has elapsed, the first user's secure collaboration application determines whether the signature of the first nonce is valid using the second user's user-level public key, which was received from the secure directory with the second user's public information. If the signature is not valid, the first user's secure collaboration application terminates the secure telecommunication channel. However, if the signature received in the response is valid, the first user's secure collaboration application begins transmitting encrypted telecommunication data over the first secure telecommunication channel.

Accordingly, the present disclosure describes techniques that allow a first entity to authenticate the identity of a second entity when establishing a secure communication channel by using a challenge-response technique. This technique is an improvement over the prior art since it allows the call initiator to verify the identity of the called party and that the called party is responding from a registered device, thereby receiving assurances that a malicious user has not accessed the second user's account.

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

FIG. 1 illustrates an embodiment of an environment in which secure communications are exchanged. In particular, FIG. 1 illustrates a first client device 210 and a second client device 220 exchanging data with a security platform 120 via a control channel 170 and a communication server 150 via a communication channel 180.

According to the embodiments described herein, encrypted communications are exchanged using secure communication containers, which encapsulate a sender's communication data and control data. The secure communication container may also include information, such as encryption information, hardware binding information, message security controls, and decryption information—for multiple receivers (as applicable)—to securely travel with the message. The secure communication container also provides cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices are able to decrypt the communications. Thus, for example, the security platform 120 and the communication server 150 are unable to decrypt communications between the first client device 210 and the second client device 220. As will further be described in more detail below, using the techniques described herein, communicants can maintain a secure communication channel.

In preferred embodiments, security platform 120 may be implemented on server (not shown), such as a stand-alone server, a corporate server, or a server located in a server farm or cloud-computing environment. Alternatively, the server hosting security platform 120 may be a cloud service provider running a virtual machine configured to provide security platform 120 to an enterprise in the context of Software as a Service (SaaS).

Security platform 120 may be configured to facilitate the exchange of communications for users of a secure collaboration application. As used herein, "communications" and "messages" may take a variety of forms, including: text messages, chat room messages, file sharing, file collaboration, control messages, commands, e-mails, documents, audiovisual files, Short Message Service messages (SMSes), voice calls (i.e., VOIP), video calls, and video conferences. Telecommunications, as used herein, refers to audio calls, voice calls, audiovisual conferences, audio conferences, video calls, videoconferences, and other forms of multimodal communications. Additionally, the content of the messages and/or communications may pertain to electronic transactions, such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Security platform 120 may facilitate the exchange of communications and control messages via control channel 170. Control channel 170 may be an encrypted communication channel, such as Transport Layer Security (TLS) or Secure Sockets Layer (SSL), through a public network, such as the Internet, World Wide Web, local Ethernet networks, private networks using communication protocols proprietary to one or more companies, and cellular and wireless networks (e.g., WiFi). In preferred embodiments, text messages, chat room messages, control messages, commands, e-mails, and Short Message Service messages (SMSes) may be exchanged via the control channel 120. Control messages include commands and instructions sent from either the security platform 120 or a first user's secure collaboration application to a second user's secure collaboration application. Additionally, these control messages may include configuration information to allow the first and second user collaboration applications to configure a secure chat room, initialize an encrypted call, or securely transfer a file.

Like control channel 170, communication channel 180 may be an encrypted communication channel through a public network. Communication channel 180 differs from control channel 170 in that it is primarily used to exchange encrypted files, documents, and telecommunication data. In operation, encrypted data may be transmitted over communication channel 180, while the information necessary to decrypt the encrypted data is transmitted in an encrypted format over the control channel 170. In preferred embodiments, control channel 170 and communication channel 180 are two separate, unique communication channels.

Security platform 120 may provide encrypted communications that easily integrate into and secure existing systems while also providing compliant and secure communications. In this regard, security platform 120 may integrate with existing identity systems and include built-in support for enterprise data retention and support systems.

Security platform 120 may also include database 130. Database 130 may be a relational database that stores information in a variety of tables. In this regard, database 130 may include a record for each user of platform 120 to allow users to find other users and communicate with other users. Accordingly, database 130 may include a table of hashed usernames 132, a table of public keys and reference values 134, a table of application identifiers 136, and a table of device identifiers 138. Each user record may include a hashed username in table 132, a pool of ECDH public components and associated reference values in table 134, application identifier(s) in table 136, and device identifier(s) in table 138. Additionally, each user record may store privacy mode and privacy list entries to control with whom the user may communicate. Additionally, database 130 may include a table of communications 140. That is, the security platform may store communications and notifications for users for a predetermined time in table 140. For example, when a message is received, the security platform may store the message in the table of communications and provide an alert, such as a push notification, to the receiver. Accordingly, a receiver may access the security platform to obtain their communications stored in table 140. In preferred embodiments, table 140 may store communications for 30 days; however, this may be adjusted, as needed, based on industry standards, corporate needs, and/or to comply with industry-mandated regulations. In alternative embodiments, the table of communications 140 may store control messages and/or notifications for shared files or secure telecommunications. Receivers may access these control messages and/or notifications to obtain the information for obtaining the shared files or joining the secure telecommunication.

Security platform 120 may include one or more interface(s) 122 for communicating with client devices 210 and 220 and communication server 150. As one example, platform 120 may provide an application programming interface (API) configured to communicate with applications installed on client devices. Further, platform 120 may also include APIs for interacting with the communication server 150. Additionally, platform 120 may provide other types of interfaces, such as a web interface, or stand-alone software programs for desktops and laptops, running on various Operating Systems (OSes). The web interface may allow users of client devices to exchange communications securely (whether with one another or other users), without the need for a separately installed collaboration application. The standalone software program may allow users to exchange secure communications via software that is downloaded by each user. According to some embodiments, platform 120 may make available a master clock time available via the one or more interface(s) 122. The master clock time may be used by the secure collaboration applications to enforce secure time-to-live (TTL) values of communications as described in U.S. application Ser. No. 14/314,018, entitled "Secure Time-To-Live," the entirety of which is hereby incorporated by reference. The TTL values can be used to enforce (e.g., on behalf of a sender) time constraints on communication access (e.g., by a receiver).

Users of client devices, such as client devices 210, 220, may communicate securely with one another using the techniques described herein. For example, client devices 210, 220, may make use of the security platform 120 and the techniques described herein via a secure collaboration application (not shown) installed on the client devices. As shown in FIG. 1, client devices may be mobile devices, such as a laptop, smart phone, or tablet, or computing devices, such as desktop computers or servers. As noted above, the secure collaboration app described herein allows cross-platform communications, thereby allowing users of various devices to communicate seamlessly. Further, each user may have different instances of the collaboration application across multiple devices. That is, the user of device 210 may be able to receive communications on both device 210, as well as on any other devices that the user may have that includes a copy of the secure collaboration application, such as a laptop. In some embodiments, client devices 210, 220 may be the users' personal devices (i.e. a bring your own device (BYOD) scenario). Alternatively, client devices may include other types of devices, such as game consoles, camera/video recorders, video players (e.g., incorporating DVD, Blu-ray, Red Laser, Optical, and/or streaming technologies), smart TVs, and other network-connected appliances, as applicable. According to one embodiment, client devices 210, 220 may be landline phones and the security platform and communication server may be installed on a Private Branch Exchange (PBX) or other corporate phone network.

In addition to communicating with security platform 120, client devices 210, 220 may also access the communication server 150 to share encrypted files or to participate in secure telecommunications with other devices. In this regard, users may upload communication data 160, such as files, documents, spreadsheets, images, animated gifs, streaming audio data, streaming video data, etc., to the communication server 150 using the secure collaboration applications located on their client devices. According to preferred embodiments, the secure collaboration application allows clients to encrypt the communication data before uploading it to the communication server. In some embodiments, the communication server 150 and the security platform 120 are co-located. In alternative embodiments, the communication server 150 and the security platform 120 may be physically separated on two different servers.

Figure 2:
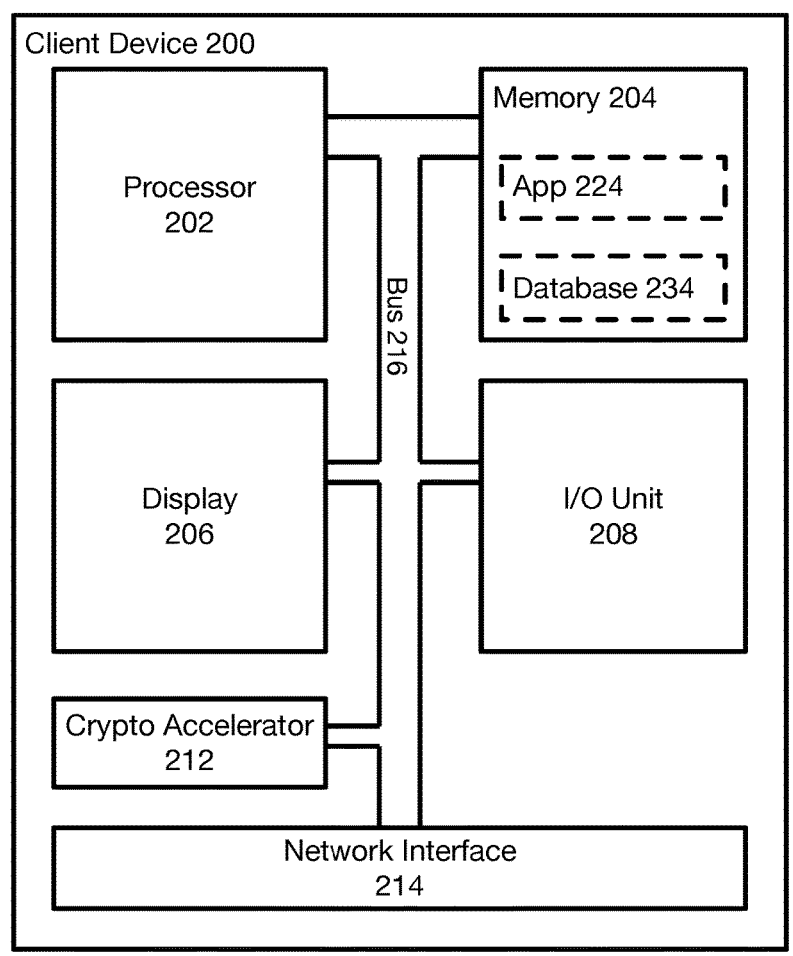
FIG. 2 illustrates a client device that transmits and receives encrypted communications using a secure collaboration app.

FIG. 2 illustrates an exemplary client device 200 that may access the security platform 120 via a secure collaboration app. In this regard, client device 200 includes a processor 202, a memory 204, a display 206, an I/O unit 208, a cryptographic ("crypto") accelerator 212, and a network interface 214 all interconnected by bus 216. Processor 202 may be any processor capable of interacting with the components of client device 200. For example, processor 202 may include a processor, multiprocessors, multicore processor, a dedicated controller, such as an ARM processor, an ASIC, or an FPGA, or any combination thereof. Memory 204 may store information accessible by processor 202, including instructions and data that may be executed or otherwise used by the processor 202 and/or crypto accelerator 212. For example, memory 204 may store instructions, such as app 224. In preferred embodiments, app 224 may be a secure collaboration app that provides users with the ability to participate in secure telecommunications, share encrypted content, and exchange encrypted communications. Encrypted communications may include direct communications (e.g., one-to-one communications between a sender and receiver), group chats, or secure chat room communications. Data stored by memory 204 may also include database 234. Database 234 may be encrypted via an encryption algorithm, such as Advanced Encryption Standard (AES), and a 256-bit key, referred to hereinafter as a local storage key. In some embodiments, database 234 may be used to store information related to secure collaboration app 224. For example, database 234 may index information related to the secure collaboration app, such as key information, user information, friend information, and communications. In this regard, communications transmitted and received by the secure collaboration app, including a message identifier, a hash of the sender's username, a hash of the sender's appID, a hash of the receiver's username, a hash of the receiver's appID, the message encryption key, and a timestamp of each communication may be stored in database 234. Accordingly, memory 204 may be any type of media capable of storing the information above, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 204 may include short term or temporary storage as well as long term or persistent storage.

Display 206 may be any electronic device capable of rendering information visually. In mobile devices, such as smart phones and tablets, display 206 may be a touchscreen. In this regard, display 206 may be integrated with I/O unit 208 to detect user inputs, in addition to outputting data information to the user. In computing devices, display 206 may be an output, such as a VGA, DVI, or HDMI output, configured to connect to a monitor. I/O unit 208 may be capable of receiving input from a user. As noted above, the I/O unit 208 may work with touchscreen displays to receive input from a user. Alternatively, the I/O unit may be an interface capable of interacting with input and output devices, such as keyboards, mice, monitors, printers, etc. Additionally, the I/O unit 208 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors. Furthermore, the I/O unit 208 may control a microphone, speaker, and/or camera that may be used for secure telecommunications.

Crypto accelerator 212 may be dedicated hardware, software, or any combination thereof that is capable of performing cryptographic operations, such as key generation, random number generation, encryption/decryption, signature generation, signature verification, etc. In preferred embodiments, crypto accelerator 212 is a dedicated processor configured to perform cryptographic operations on behalf of processor 202. In this regard, app 224 may make use of crypto accelerator 212 to provide the secure communication functions described in greater detail below.

Network interface 214 may be dedicated hardware, software, or any combination thereof that is capable of connecting client device 200 to network 112. In this regard, network interface 214 may include various configurations and use various communication protocols including Ethernet, TCP/IP, ATM, cellular and wireless communication protocols (e.g. 802.11, LTE), instant messaging, HTTP and SMTP, and various combinations of the foregoing.

Figure 3:
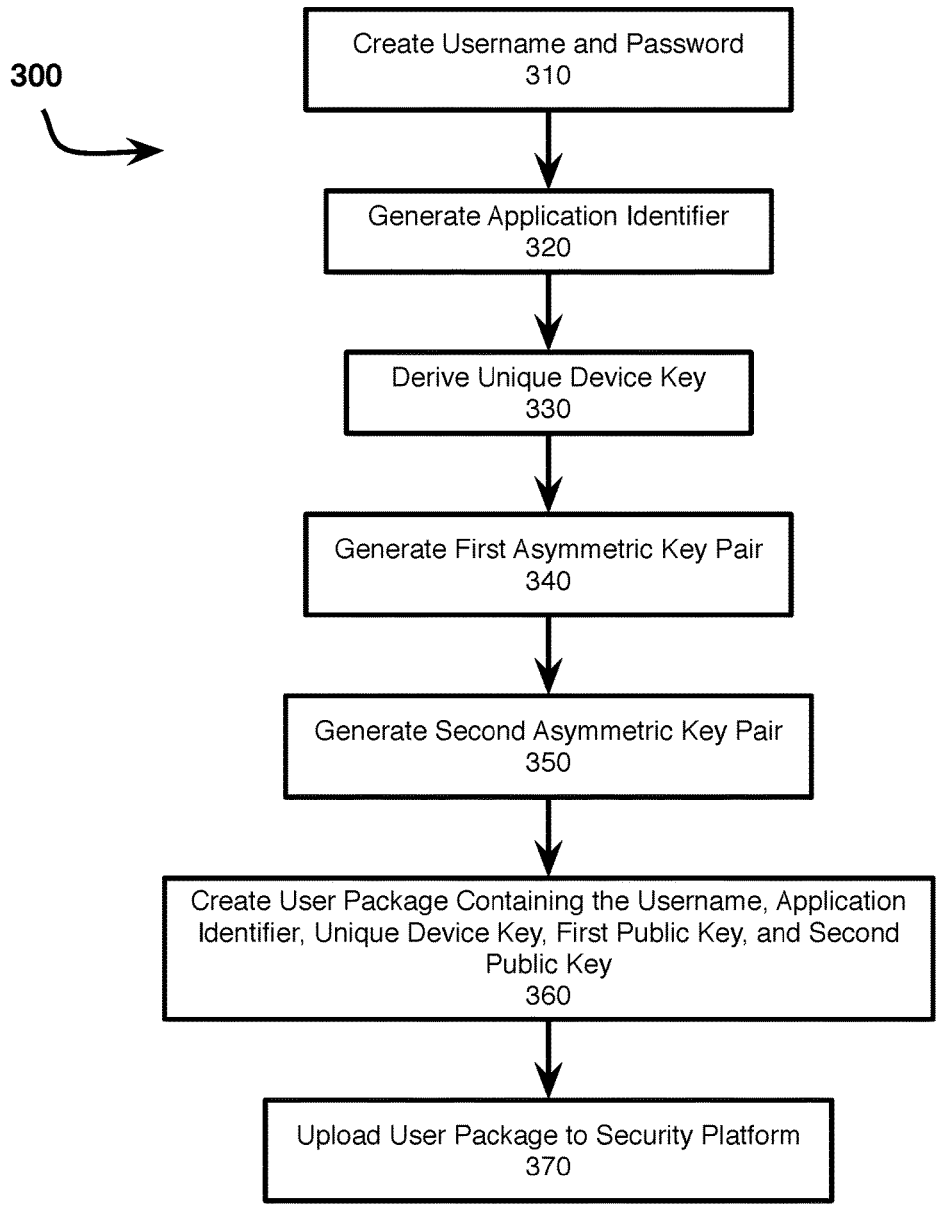
FIG. 3 illustrates a process for registering a user's secure collaboration application with a security platform.

In order to begin exchanging secure communications, users must download and install the secure collaboration application on one of their devices. Once a first user has installed the secure collaboration application on their device, the first user must then create and register their account with the security platform. FIG. 3 illustrates a process 300 of creating and registering a first user's account.

Process 300 begins in block 310, when the first user creates a username and password. In this regard, the first user may enter a username, which the secure collaboration application provides to the security platform to ensure that the username is not already being used by another user. If the username is already in use, the security platform will provide an indication to the first user's secure collaboration application that the username is taken. The first user will select another username and the process will be repeated until the security platform indicates that the username selected by the first user is not taken by another user. In creating a password, the secure collaboration application may enforce minimum password requirements, such as mandating a minimum length and certain characters.

In block 320, the first user's secure collaboration application generates an application identifier. The application identifier is a random identifier that distinguishes the first user's secure collaboration application from other instantiations of the secure collaboration application that the first user may be executing on other devices. In preferred examples, the application identifier is generated by hashing a set of pseudorandom bytes.

In block 330, the first user's secure collaboration application derives a unique device key. The unique device key is a symmetric key derived by passing a unique device identifier, a salt, and padding through multiple rounds of a hash function, such as SHA256 or SHA384. The unique device identifier may include one or more hardware and software identifiers, including hard drive identifiers, motherboard identifiers, CPU identifiers, MAC addresses, etc. The salt and padding information may be included in the secure collaboration application at the time it was downloaded or, alternatively, obtained from the security platform, for example, when the first user is selecting a username. The unique device key is specific to the device that the first user's secure collaboration application is executing upon. In this regard, if the first user has instantiations of the secure collaboration application on different devices, each device would have its own unique device key. Additionally, when the first user upgraded, or otherwise replaced a device, the new device would generate its own unique device key, including circumstances in which the new device was restored from a backup of the previous device.

In block 340, the secure collaboration application generates a first asymmetric key pair. The first asymmetric key pair is a user-level signing key pair that includes a private key, which is used to generate signatures, and a public key, which is used to validate signatures. In preferred embodiments, the first asymmetric key pair is generated according to Elliptic Curve Cryptography (ECC) using a P-521 curve. When the first user has multiple instantiations of the secure collaboration application on different devices, the first asymmetric key pair is the same across every instance.

In block 350, the secure collaboration application generates a second asymmetric key pair. The second asymmetric key pair is an application-level signing key pair generated in a manner similar to the first asymmetric key pair. Each instance of the secure collaboration application will have a unique second asymmetric key pair when the first user has the secure collaboration application installed on a plurality of devices.

After creating a username and password and deriving a plurality of keys, the secure collaboration application creates a user package for the first user in block 360. The user package includes the username, the application identifier, the user-level public signing key, and the application-level public signing key. In block 370, the user package is uploaded to the security platform and stored in its database. Accordingly, the security platform will distribute the first user's user package in response to receiving requests from other users that wish to communicate with the first user.

Figure 4:
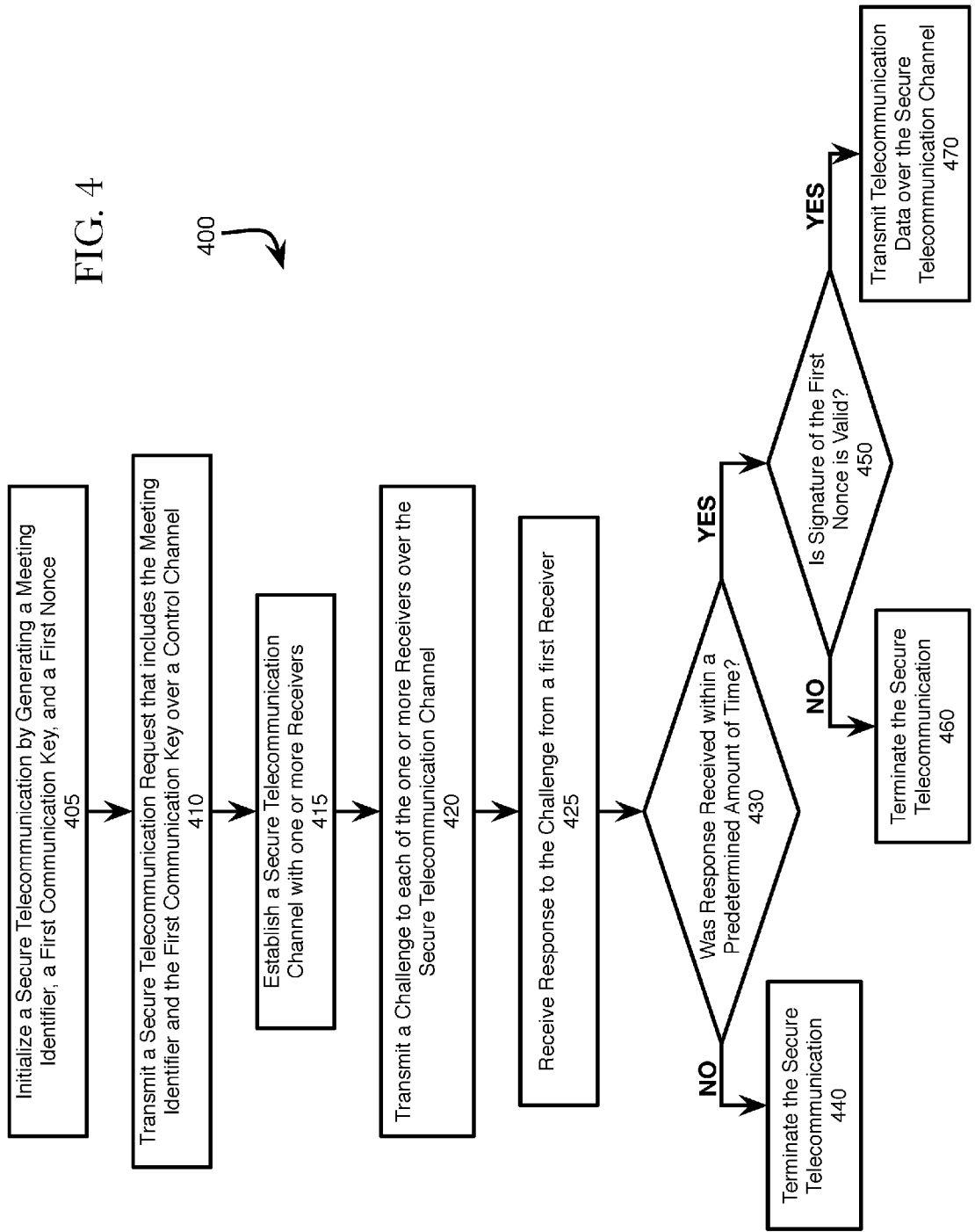
FIG. 4 illustrates a process for initiating a secure communication channel between an initiator and a receiver.

After the first user uploads their user package to the security platform, the first user may begin securely communicating with other users. This includes sending encrypted messages, encrypted file sharing, and secure telecommunications. FIG. 4 illustrates an example of a process 400 for establishing a secure telecommunication channel between a first user and a second user.

Process 400 begins in block 405, when the first user, the call initiator, initializes a secure telecommunication via an input. For example, in a one-to-one communication or a group chat, the first user may select an icon, such as a telephone icon or a video camera icon, to initiate the secure telecommunication. Because the first user is already in a communication session with the second user, the first user's secure collaboration application has obtained the second user's user package from the security platform. Accordingly, the first user is in possession of the second user's user-level public signing key, as well as the application identifier, the unique device key, and the application-level public signing key for each instances of the second user's secure collaboration application.

In response to the first user's input, the first user's secure collaboration app begins to establish the secure telecommunication by generating a meeting identifier and a first communication key. The secure collaboration application generates the meeting identifier by hashing at least one property associated with the secure telecommunication, such as the number of participants in the telecommunication, the date and time the telecommunication commenced, or information identifying the first user (e.g., username, device identifier, application identifier, etc.). The secure collaboration application also generates a first communication key; the first communication key is a 256-bit key generated by applying multiple rounds of a hash function (e.g. SHA256, SHA384, SHA521) to a first set of pseudorandom bytes derived from the first user's device. The first set of pseudorandom bytes may be derived from ephemeral environmental noise obtained from device drivers and other kernel operations. For example, data from various sensors (e.g., the at least one accelerometer, Global Positioning Satellite (GPS) system, magnetometer, proximity sensor, ambient light sensor, moisture sensor, and gyroscope) may be used as the first set of pseudorandom bytes. In addition to the meeting identifier and the first communication key, the first user's secure collaboration application generates a first nonce. In operation, the first nonce is pseudorandom data generated by a random number generator that is provided to the second user via a challenge designed to authenticate the second user's identity. The first nonce may be derived by hashing information related to the secure telecommunication, such as the meeting identifier, the start time of the secure telecommunication, participant identifiers, etc.

In block 410, the first user's secure collaboration application transmits a secure telecommunication request to the second user. The secure telecommunication request includes at least the meeting identifier and the first communication key. After transmitting the secure telecommunication request, the call initiator establishes a secure telecommunication channel with the one or more receivers in block 415.

Once the secure communication channel is established, the first user's secure collaboration application transmits a challenge, that includes the first nonce, to each of the one or more second users' secure collaboration applications in block 420. In preferred embodiments, the challenge is encrypted with the first communication key and transmitted to each of the one or more receivers via the secure telecommunication channel.

After transmitting the challenge to the second user's secure collaboration application, the first user's secure collaboration application expects to receive a response to the challenge within a predetermined time. If no response is received, the first user tears down the secure communication channel and the secure telecommunication session is ended. However, in block 425, the call initiator receives a response from a first receiver. Typically, the response includes a signature of the first nonce that the first receiver generated using his/her user-level private signing key. In block 430, the first user's secure collaboration application determines whether the response was received within a predetermined amount of time. For example, the first user's secure collaboration application may expect a response to the challenge in accordance with the telecommunication protocol's time out limit, such as two seconds. In preferred embodiments, the first user's secure collaboration application may initialize a counter to determine whether a predetermined amount of time has elapsed since the challenge was transmitted. Alternatively, the first user's secure collaboration application may compare the timestamp of the response with the timestamp of challenge to determine if the second user exceeded an allotted time to respond. If the response exceeded the predetermined amount of time, process 400 proceeds to block 440, where the first user's secure collaboration application terminates the secure telecommunication session. The time-out provides an additional layer of security by limiting the time a man-in-the-middle attacker would have to generate and respond to the challenge with a fraudulent response.

If a response was received within the allotted timeframe, process 400 proceeds to block 450 where the first user's secure collaboration application determines whether the signature of the first nonce is valid. In preferred examples, the first user's secure collaboration application verifies the signature of the nonce using the second party's user-level public signing key. As noted above, the first user's secure collaboration application obtains the second user's user-level public signing key from the security platform when the first user's secure collaboration application requests the second user's user package from the security platform. If the signature is invalid, the first user's secure collaboration application tears down the secure telecommunication channel in block 460. However, if the signature is valid, the first user's secure collaboration application begins transmitting telecommunication data over the secure telecommunication channel in block 470.

FIG. 4 illustrates a process for sending a challenge to, and receiving a response from, a second user. When the first user begins a telecommunication with multiple participants, the process 400 would be repeated for each participant of the telecommunication session. Accordingly, the first user's secure collaboration application creates and maintains a matrix, table, or database that includes each participant of the group telecommunication, a first indication of whether the participant has responded to the challenge, and an indication of whether the response was valid. In this way, the first user's secure collaboration application manages membership of the group telecommunication, thereby ensuring that unauthorized users do not participate in the group telecommunication.

Figure 5:
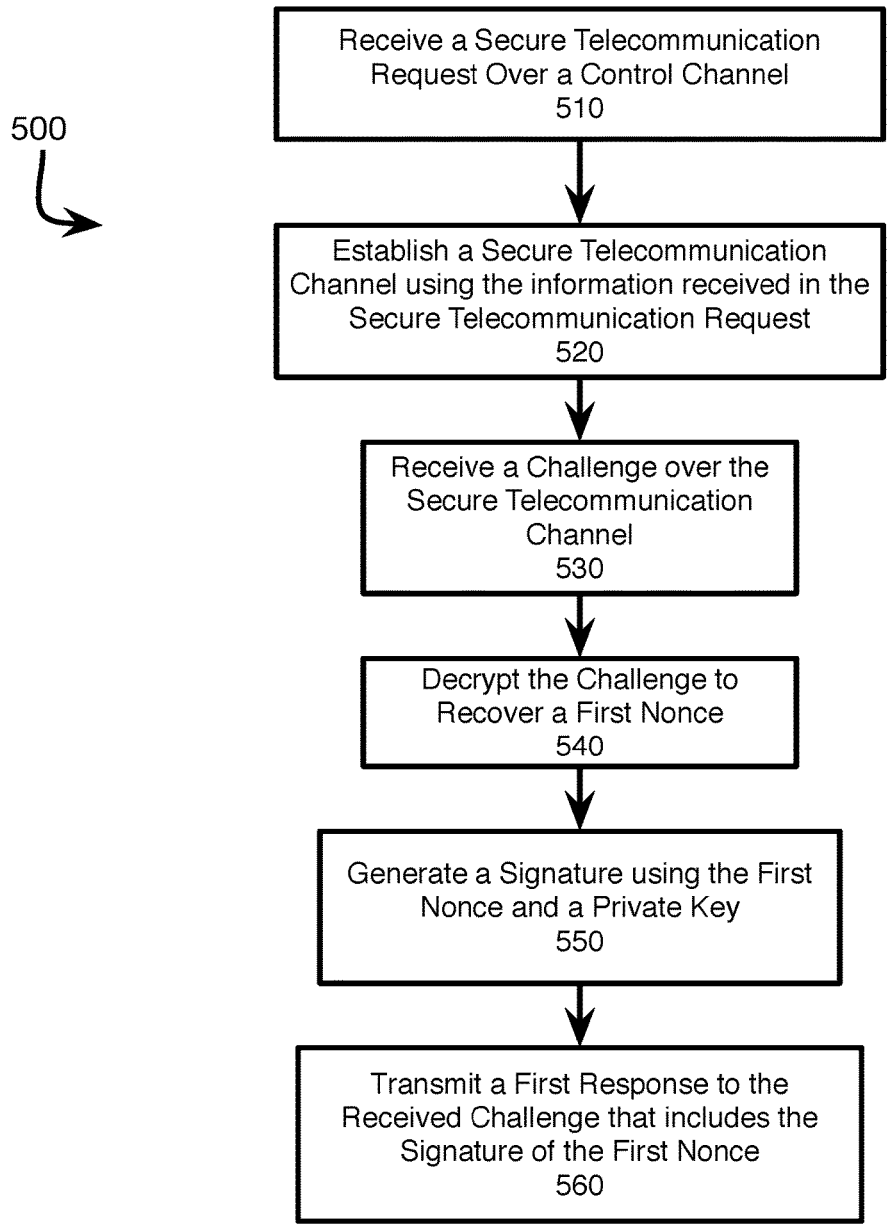
FIG. 5 illustrates a process for responding to a request to create a secure communication channel.

Turning to FIG. 5, an exemplary process 500 for responding to a secure telecommunication request and a challenge is shown. In block 510, the second user's secure collaboration application receives a secure telecommunication request that includes the meeting identifier and first communication key generated by the first user's secure collaboration application. Next, in block 520, the second user's secure collaboration application establishes a secure telecommunication channel, with the first user's secure collaboration application, using information received in the secure telecommunication request. Specifically, the second user's secure collaboration application uses the received meeting identifier and first communication key to send and receive encrypted data with the first user's secure collaboration application.

After the first and second users establish a secure communication channel, the second user receives a challenge, that includes the first nonce, from the first user over the recently established secure communication channel. If the second user does not receive the challenge within a predetermined amount of time after receiving the secure telecommunication request, the second user's secure collaboration application will tear down the secure communication channel as a precaution against malicious users. This is a security improvement designed to prevent the second user from communicating with malicious users and unauthorized versions of the secure collaboration application.

In block 540, the second user's secure collaboration application decrypts the received challenge to obtain the first nonce. In preferred embodiments, the second user's second collaboration application uses the first communication key, received in the Secure Telecommunication Request, to decrypt the received challenge. After decrypting the challenge, the second user's secure collaboration application generates a signature using the received first nonce and the second user's user-level private signing key in block 550. As discussed above, the secure collaboration application generates the signature according to a signature generation algorithm, such as Elliptic Curve Digital Signature Algorithm (ECDSA). After generating the signature, the second user's secure collaboration application transmits a first response, including the signature of the first nonce, to the first user's secure collaboration application. In preferred embodiments, the first response is encrypted with the first communication key prior to being transmitted to the first user's device.

Figure 6:
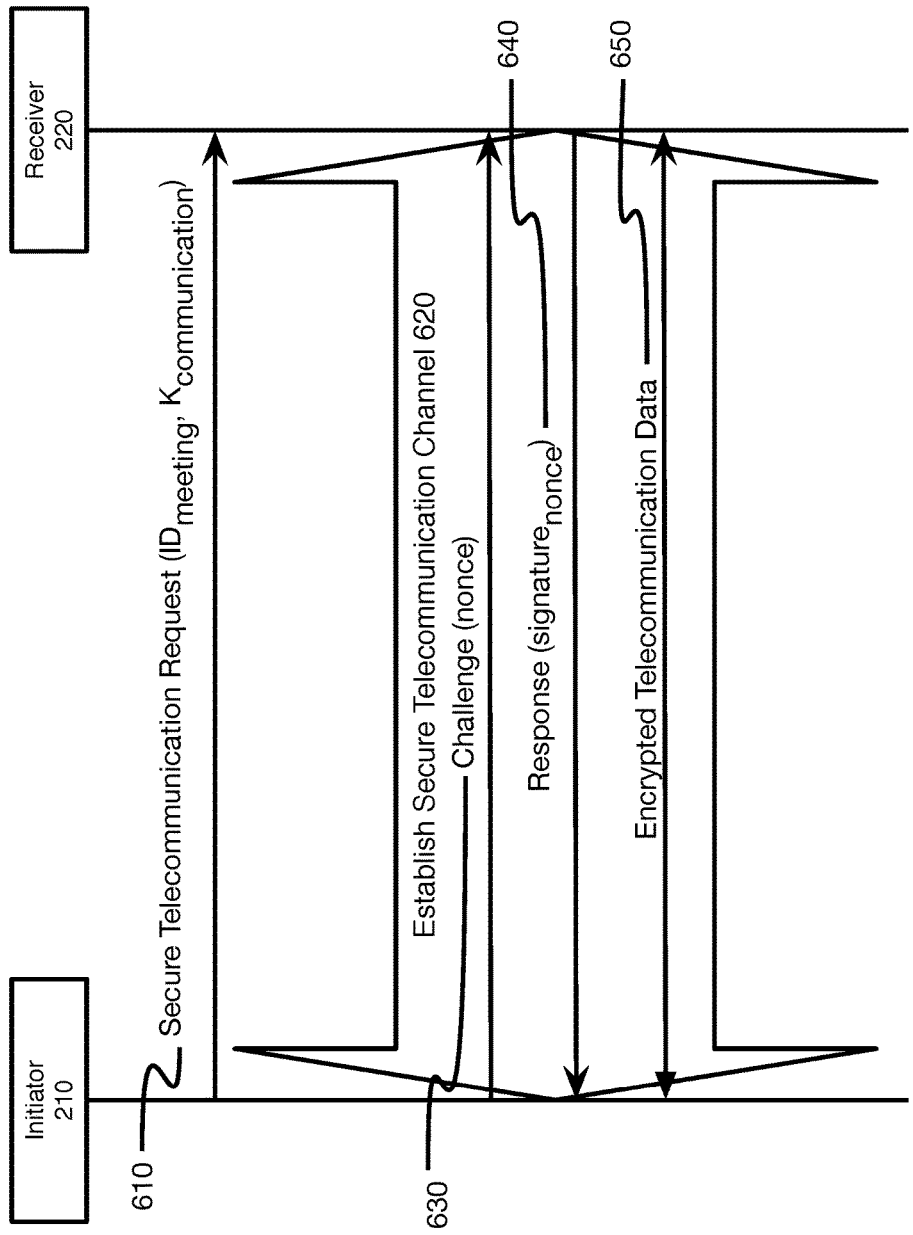
FIG. 6 shows an exemplary flow between an initiator and receiver for establishing a secure communication channel.

FIG. 6 shows an exemplary flow of successfully establishing a secure telecommunication channel between a first user device 210 and a second user device 220. As noted above, establishing a secure communication channel begins in 610 with the first user's (e.g., the call initiator's) device 210 sending a secure telecommunication request to the second user's (e.g., called party's) device 220. As shown, the secure telecommunication request includes a meeting identifier and a first communication key. In 620, the first user device and second user device establish a secure telecommunication channel between them based upon the information included in the secure telecommunication request.

In 630, the call initiator's device 210 transmits a challenge, that includes a nonce, to the called party's device via the secure telecommunication channel. As noted above, the challenge is encrypted with the first communication key. Accordingly, the called party's device 220 receives the encrypted challenge, decrypts the challenge using the first communication key, and generates a signature of the decrypted first nonce. In 630, the called party's device 220 transmits a response to the call initiator's device 210 that includes the signature of the first nonce. The call initiator receives the response and decrypts it to obtain the called party's signature of the first nonce. Accordingly, the call initiator verifies the signature received in the called party's response. When the signature is valid, the call initiator and the called party's devices begin exchanging encrypted telecommunication data via the secure telecommunication channel in 640. As discussed previously, the telecommunications data is encrypted according to the first communication key established between the users with the secure telecommunication request.

As apparent from the description above, the challenge-response technique during the call establishment phase represents an improvement over the prior art since it allows a call initiator to verify the identity of the called party without exchanging any sensitive or confidential information. Further, the challenge-response technique described herein allows the call initiator to verify that the called party is responding from a registered device. These additional verifications provide assurances that a malicious user has not accessed the second user's account, and provide an additional layer of security over other calling applications, which merely rely on a party's login credentials to verify the identity of a user.

Although the foregoing embodiments have been described in some detail for purposes of clarity of understanding, the present disclosure is not limited to the details provided. There are many alternative ways of implementing the present disclosure. The disclosed embodiments are illustrative and not restrictive.

What is claimed is:

1. A system, comprising:
 a processor configured to:
  initialize a secure telecommunication by transmitting a request to one or more receiver devices over a control channel, wherein the request includes a first meeting identifier and a first communication key;
  establish a first secure telecommunication channel with at least one of the one or more receiving devices, wherein the first secure telecommunication channel is separate from the control channel;
  transmitting a challenge to the one or more receiver devices over the first secure telecommunication channel, wherein the challenge includes a first nonce;
  receive a first response to the challenge from a first receiving device, wherein the response includes a signature of the first nonce;
  determine whether the signature of the first nonce is valid; and
  transmit encrypted telecommunication data over the first secure telecommunication channel when the signature of the first nonce is valid; and
 a memory coupled to the processor and configured to provide the processor with instructions.

2. The system of claim 1, wherein the processor is further configured to:
 determine whether the first response is received from the first receiving device within a predetermined amount of time, wherein the predetermined amount of time is a time since the challenge was transmitted to the one or more receiving devices.

3. The system of claim 2, wherein the processor is further configured to:
 terminate the secure telecommunication channel with the first receiving device when the first response was not received before the predetermined amount of time elapsed.

4. The system of claim 1, wherein the processor is further configured to:
 terminate the secure telecommunication channel with the first receiving device when the signature is invalid.

5. The system of claim 1, wherein the processor is further configured to:
 generate the first nonce using a random number generator.

6. The system of claim 5, further comprising:
obtain a signature verification key from a third party, wherein the signature verification key is a public key that corresponds to a private key used to generate the signature of the first nonce; and
verifying the signature of the first nonce using the signature verification key.

7. A method comprising:
initializing, on a first device, a secure telecommunication by transmitting a request to one or more receiver devices over a control channel, wherein the request includes a first meeting identifier and a first communication key;
establishing, at the first device, a first secure telecommunication channel with at least one of the one or more receiving devices, wherein the first secure telecommunication channel is separate from the control channel;
transmitting, by the first device, a challenge to the one or more receiver devices via the first secure telecommunication channel, wherein the challenge includes a first nonce;
receiving, at the first device, a first response to the challenge from a second device, wherein the response includes a signature of the first nonce;
determining, at the first device, whether the signature of the first nonce is valid; and
transmitting encrypted telecommunication data over the first secure telecommunication channel when the signature of the first nonce is valid.

8. The method of claim 7, further comprising:
determining, at the first device, whether the first response is received from the second device within a predetermined amount of time, wherein the predetermined amount of time is a time since the challenge was transmitted to the one or more receiving devices.

9. The method of claim 8, further comprising:
terminating, at the first device, the secure telecommunication channel with the second device when the first response was not received before the predetermined amount of time elapsed.

10. The method of claim 7, further comprising:
terminating, at the first device, the secure telecommunication channel with the second device when the signature is invalid.

11. The method of claim 7, further comprising:
generating, at the first device, the first nonce using a random number generator.

12. The method of claim 7, further comprising:
obtaining, at the first device, a signature verification key from a third party, wherein the signature verification key is a public key that corresponds to a private key used to generate the signature of the first nonce; and
verifying, at the first device, the signature of the first nonce using the signature verification key.

13. The method of claim 7, further comprising:
generating the first communication key using a first set of pseudorandom bytes derived from one or more operations of the first device.

14. A non-transitory computer-readable medium comprising instructions that when, executed by at least one processor, perform the steps of:
initializing a secure telecommunication by transmitting a request to one or more receiver devices over a control channel, wherein the request includes a first meeting identifier and a first communication key;
establishing a first secure telecommunication channel with at least one of the one or more receiving devices, wherein the first secure telecommunication channel is separate from the control channel;
transmitting a challenge to the one or more receiver devices via the first secure telecommunication channel, wherein the challenge includes a first nonce;
receiving a first response to the challenge from a second device, wherein the response includes a signature of the first nonce;
determining whether the signature of the first nonce is valid; and
transmitting encrypted telecommunication data over the first secure telecommunication channel when the signature of the first nonce is valid.

15. The non-transitory computer-readable medium of claim 14, further comprising instructions for:
determining whether the first response is received from the second device within a predetermined amount of time, wherein the predetermined amount of time is a time since the challenge was transmitted to the one or more receiving devices.

16. The non-transitory computer-readable medium of claim 15, further comprising instructions for:
terminating the secure telecommunication channel with the second device when the first response was not received before the predetermined amount of time elapsed.

17. The non-transitory computer-readable medium of claim 14, further comprising instructions for:
terminating the secure telecommunication channel with the second device when the signature is invalid.

18. The non-transitory computer-readable medium of claim 14, further comprising instructions for:
generating the first nonce using a random number generator.

19. The non-transitory computer-readable medium of claim 14, further comprising:
obtaining a signature verification key from a third party, wherein the signature verification key is a public key that corresponds to a private key used to generate the signature of the first nonce; and
verifying the signature of the first nonce using the signature verification key.

* * * * *